United States Patent
Paulson

(10) Patent No.: US 11,919,620 B2
(45) Date of Patent: Mar. 5, 2024

(54) COMMON SPAR ASSEMBLY FOR USE IN NONFOLDABLE AND FOLDABLE PROPROTOR BLADES

(71) Applicant: Bell Helicopter Textron Inc., Fort Worth, TX (US)

(72) Inventor: Jared Mark Paulson, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 16/247,736

(22) Filed: Jan. 15, 2019

(65) Prior Publication Data

US 2020/0223532 A1 Jul. 16, 2020

(51) Int. Cl.
*B64C 11/28* (2006.01)
*B64C 11/46* (2006.01)
*B64C 27/50* (2006.01)
*B64C 29/00* (2006.01)

(52) U.S. Cl.
CPC .............. *B64C 11/28* (2013.01); *B64C 11/46* (2013.01); *B64C 27/50* (2013.01); *B64C 29/0033* (2013.01)

(58) Field of Classification Search
None
See application file for complete search history.

(56) References Cited

U.S. PATENT DOCUMENTS

| | | | | |
|---|---|---|---|---|
| 8,500,407 | B1 * | 8/2013 | Kennedy | B64C 27/48 416/210 R |
| 2017/0327205 | A1 * | 11/2017 | Paulson | B64C 29/0033 |
| 2017/0334548 | A1 * | 11/2017 | Foskey | B64C 29/0033 |

* cited by examiner

*Primary Examiner* — Juan G Flores
(74) *Attorney, Agent, or Firm* — Lightfoot & Alford PLLC

(57) ABSTRACT

A spar assembly has a spar having a tip comprising a most outboard portion of the spar, a root comprising a most inboard portion of the spar, a main section disposed inboard relative to the tip, and a middle section disposed inboard relative to the main section. The spar also has a transition section disposed between the main section and the middle section and the transition section has an outboard interface cross-sectional shape and an inboard cross-sectional shape that is different than the outboard interface cross-sectional shape.

3 Claims, 15 Drawing Sheets

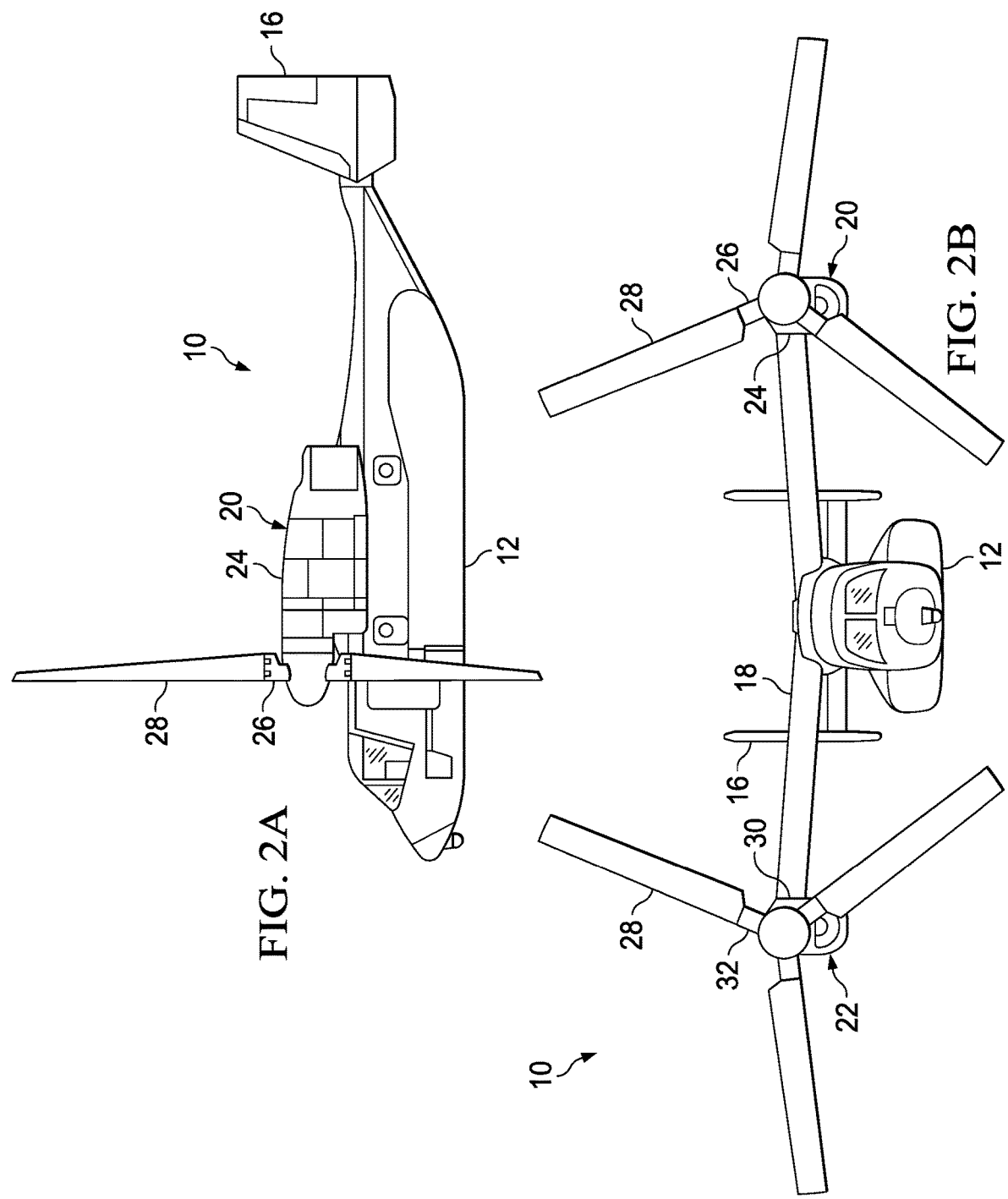

COMMON SPAR ASSEMBLY FOR USE IN NONFOLDABLE AND FOLDABLE PROPROTOR BLADES

CROSS REFERENCE TO RELATED APPLICATIONS

Not applicable.

STATEMENT REGARDING FEDERALLY SPONSORED RESEARCH OR DEVELOPMENT

Not applicable.

BACKGROUND

Tiltrotor aircraft typically include multiple rotor assemblies that are carried by the wing member of the aircraft and are generally disposed near the end portions of the wing member. Each rotor assembly can include an engine and transmission that provide torque and rotational energy to a drive shaft that rotates a proprotor including a plurality of proprotor blade assemblies. Typically, the rotor assemblies are capable of moving or rotating relative to the wing member enabling the tiltrotor aircraft to operate between a helicopter mode, in which the rotor assemblies are tilted upward, such that the tiltrotor aircraft flies much like a conventional helicopter and an airplane mode, in which the rotor assemblies are tilted forward, such that the tiltrotor aircraft flies much like a conventional propeller driven aircraft. In this manner, the proprotors generate greater lift in helicopter mode than in airplane mode, as the proprotors are oriented to generate greater thrust propelling the aircraft vertically. Likewise, the proprotors generate greater forward speed in airplane mode than in helicopter mode, as the proprotors are oriented to generate greater thrust propelling the aircraft forward.

Each proprotor blade assembly includes a blade spar to couple the proprotor blade to a rotor hub and provide structural support to the proprotor blade assembly. Depending on mission parameters, a proprotor blade assembly can be outfitted for either nonfoldable operations, wherein the proprotor blade assembly is rigid, or foldable operations, wherein the proprotor blade assembly is capable of folding relative to the rotor hub for easier storage of the aircraft. Conventional blade spars are unable to accommodate both nonfoldable and foldable operations; and proprotor blade manufacturers must manufacture different blade spars, based on operation requirements. Unfortunately, this typically involves creating two separate spar assemblies for nonfoldable and foldable blade spars. This adds complexity and drives up manufacturing cost. Accordingly, a need has arisen for a common spar assembly that can accommodate both nonfoldable and foldable blade spars.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2B are schematic illustrations of the tiltrotor aircraft of FIG. 1A in airplane mode in accordance with embodiments of the present disclosure depicted in a side view and a front view, respectively.

DETAILED DESCRIPTION

Figure 1A:
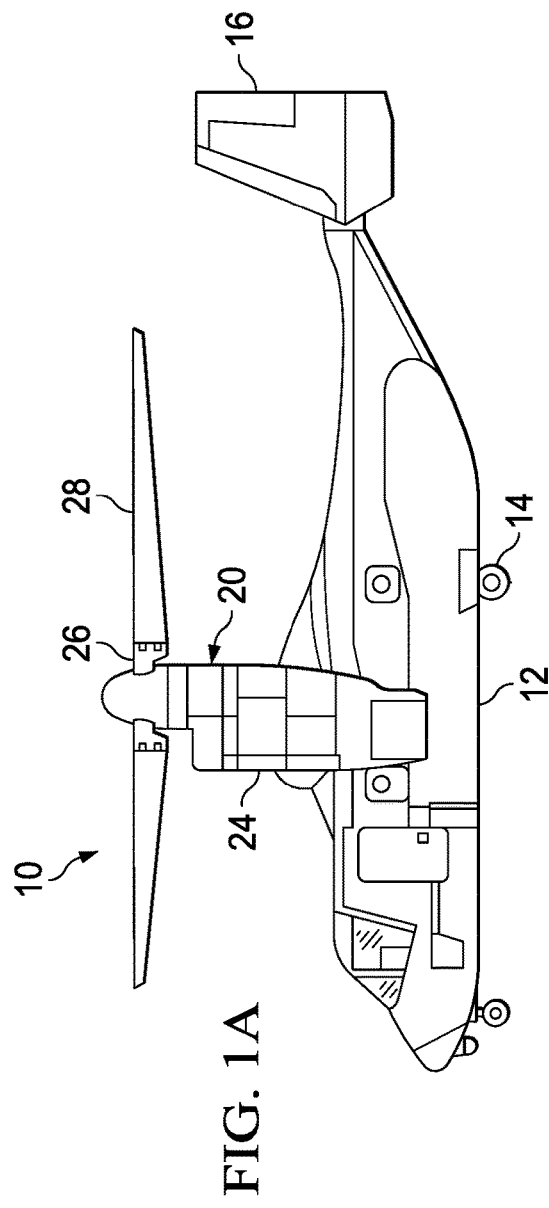
FIGS. 1A-1B are schematic illustrations of a tiltrotor aircraft in helicopter mode in accordance with embodiments of the present disclosure depicted in a side view and a front view, respectively.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation can be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIGS. 1A-1B, 2A-2B and 3A-3B in the drawings, a tiltrotor aircraft 10 is schematically illustrated. Tiltrotor aircraft 10 includes a fuselage 12, a landing gear 14, a tail member 16, a wing member 18 and rotor assemblies 20, 22. Rotor assembly 20 includes a nacelle 24 that houses an engine and transmission that provide torque and rotational energy to a drive shaft that rotates a rotor hub assembly 26 and a plurality of proprotor blade assemblies 28. Likewise, rotor assembly 22 includes a nacelle 30 that houses an engine and transmission that provide torque and rotational energy to a drive shaft that rotates a rotor hub assembly 32 and a plurality of proprotor blade assemblies 28. The position of rotor assemblies 20, 22, as well as the pitch of proprotor blade assemblies 28, is determined using a flight control system to selectively control the direction, thrust, and lift of tiltrotor aircraft 10.

Figure 1B:
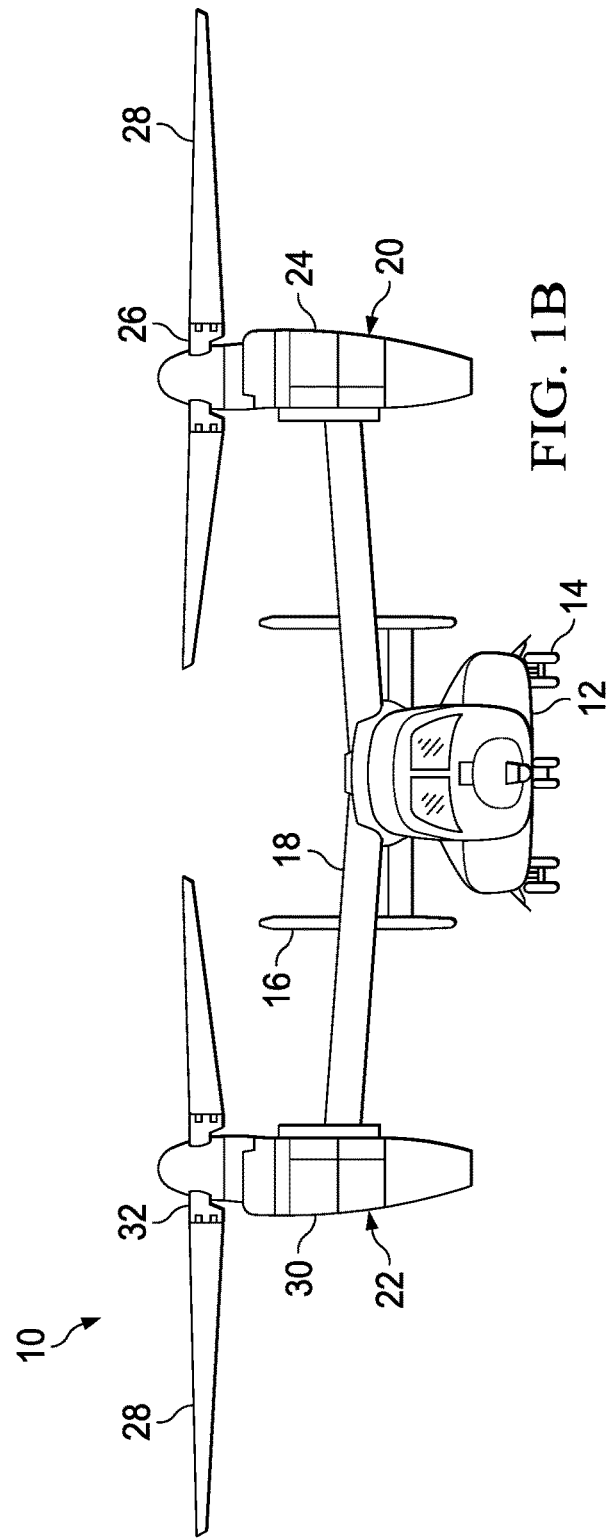
Figure 3A:
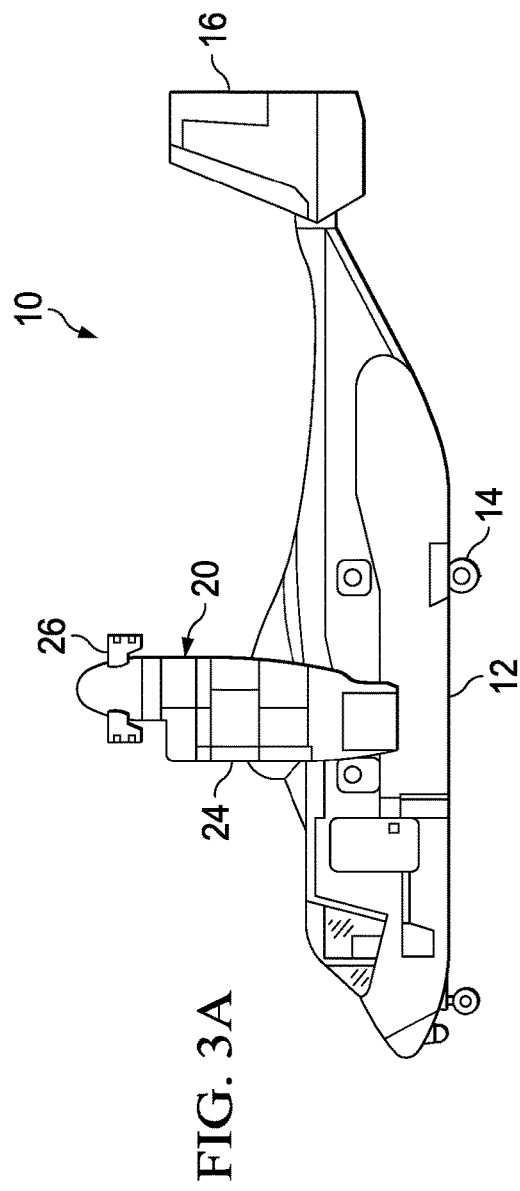
FIGS. 3A-3B are schematic illustrations of the tiltrotor aircraft of FIG. 1A with proprotor blade assemblies folded in accordance with embodiments of the present disclosure depicted in a side view and a front view, respectively.
Figure 3B:
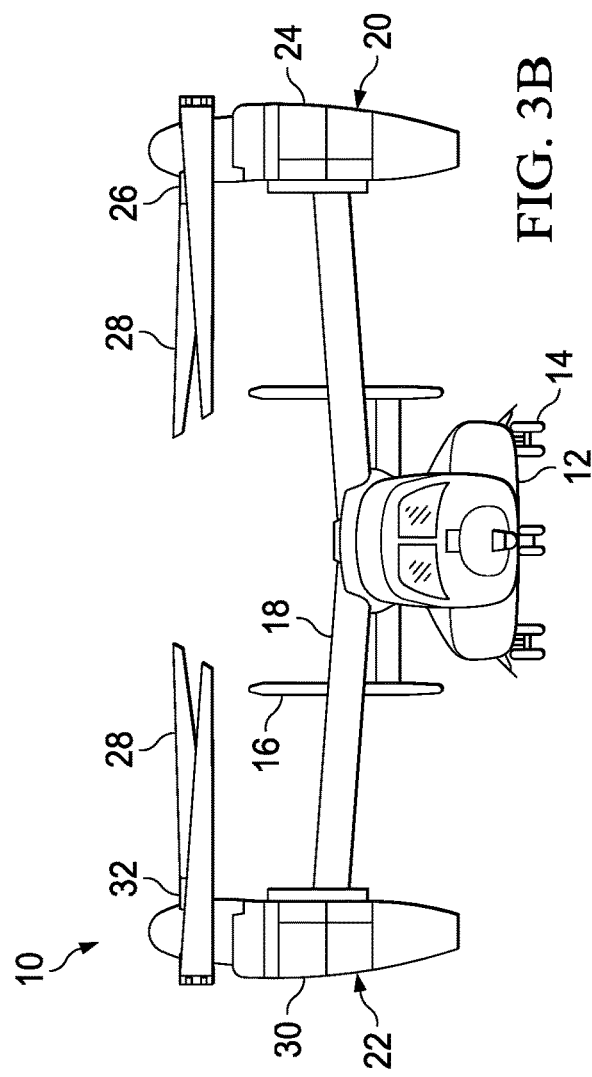

FIGS. 1A-1B illustrate tiltrotor aircraft 10 in helicopter mode, in which rotor assemblies 20, 22 are positioned substantially vertical to provide a lifting thrust, such that tiltrotor aircraft 10 flies much like a conventional helicopter. FIGS. 2A-2B illustrate tiltrotor aircraft 10 in airplane mode, in which rotor assemblies 20, 22 are positioned substantially horizontal to provide a forward thrust in which a lifting force is supplied by wing member 18, such that tiltrotor aircraft 10 flies much like a conventional propeller driven aircraft. It should be appreciated that tiltrotor aircraft 10 can be operated such that rotor assemblies 20, 22 are selectively positioned between airplane mode and helicopter mode, which can be referred to as a conversion mode. FIGS. 3A-3B illustrate tiltrotor aircraft 10 during conversion to storage mode wherein the proprotor blade assemblies 28 are configured for foldable operations and are folded in a beamwise direction, as illustrated, and wing member 18 is rotated approximately ninety degrees (not illustrated) such that wing member 28 is parallel with fuselage 12 to minimize a footprint of tiltrotor aircraft 10 for storage, for example, on an aircraft carrier.

Even though proprotor blade assemblies 28 of the present disclosure are illustrated in the context of tiltrotor aircraft 10, it should be understood by those skilled in the art that proprotor blade assemblies 28 can be implemented in a variety of ways on a variety of rotorcraft including, for example, tiltwing aircraft, quad tiltrotor aircraft, unmanned aircraft, and the like. As such, this disclosure contemplates integrating proprotor blade assemblies 28 into a variety of rotorcraft configurations. In addition, even though proprotor blade assemblies 28 are depicted as being folded in the beamwise direction, in alternative embodiments, proprotor blade assemblies 28 could be folded in other directions. For example, proprotor blade assemblies 28 could alternatively be folded such that each proprotor blade assembly 28 is generally parallel to its rotor assembly such that the tips of each proprotor blade assembly 28 would generally point in a downward direction of FIG. 1B or the aft direction of FIG. 2A.

Figure 4:
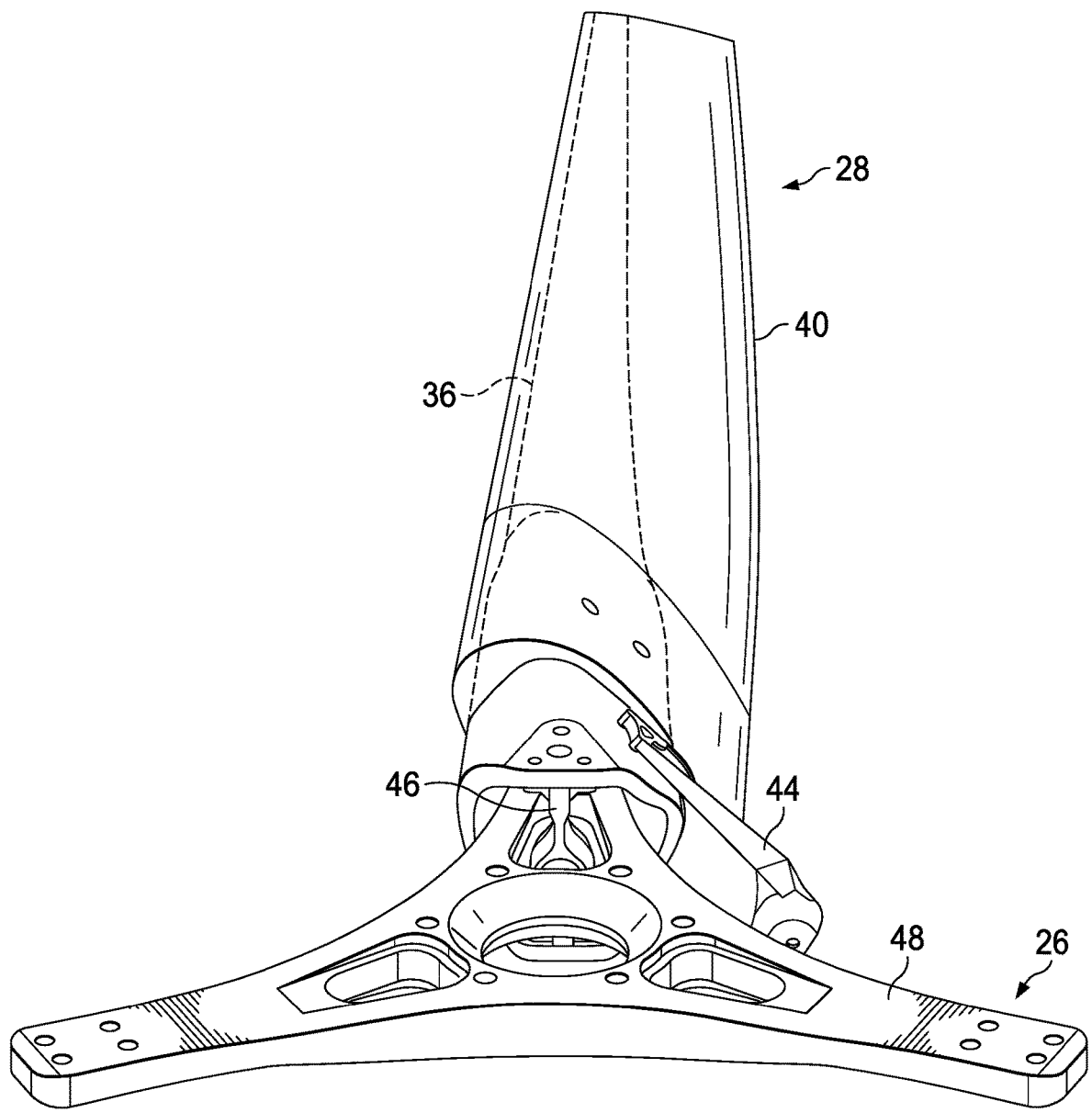
FIG. 4 is a partial view of a rotor hub assembly and a proprotor blade assembly configured for nonfoldable operations in accordance with embodiments of the present disclosure.

Referring to FIG. 4, a partial view of the rotor hub assembly 26 and the proprotor blade assembly 28 configured for nonfoldable operations are illustrated. Common parts of the rotor hub assembly 26 such as the swashplate, the rotor hub spring, the mast spinner and the pitch links, and other common parts are not shown. Also, only one of three proprotor blade assemblies 28 is shown. The rotor hub assembly 26 comprises a rotor yoke 48, a pitch horn 44, and an inboard beam 46. The pitch horn 44 and inboard beam 46 mechanically couple the rotor hub assembly 26 to the proprotor blade assembly 28. The proprotor blade assembly 28 is shown as configured for nonfoldable operations and includes a nonfoldable spar assembly 36. The proprotor blade assembly 28 further comprises a common blade assembly 40. Generally, the common blade assembly 40 comprises an upper skin, a lower skin, a sheath, an abrasion strip, tip cap, erosion shield, a heater blanket, and other commonly used blade components. A majority of the nonfoldable spar assembly's 36 lengthwise span is received within the common blade assembly 40. A portion of the nonfoldable spar assembly 36 that is proximate to the rotor hub assembly 26 extends outside the common blade assembly 40 and couples the proprotor blade assembly 28 to the pitch horn 44 and inboard beam 46.

Figure 5:
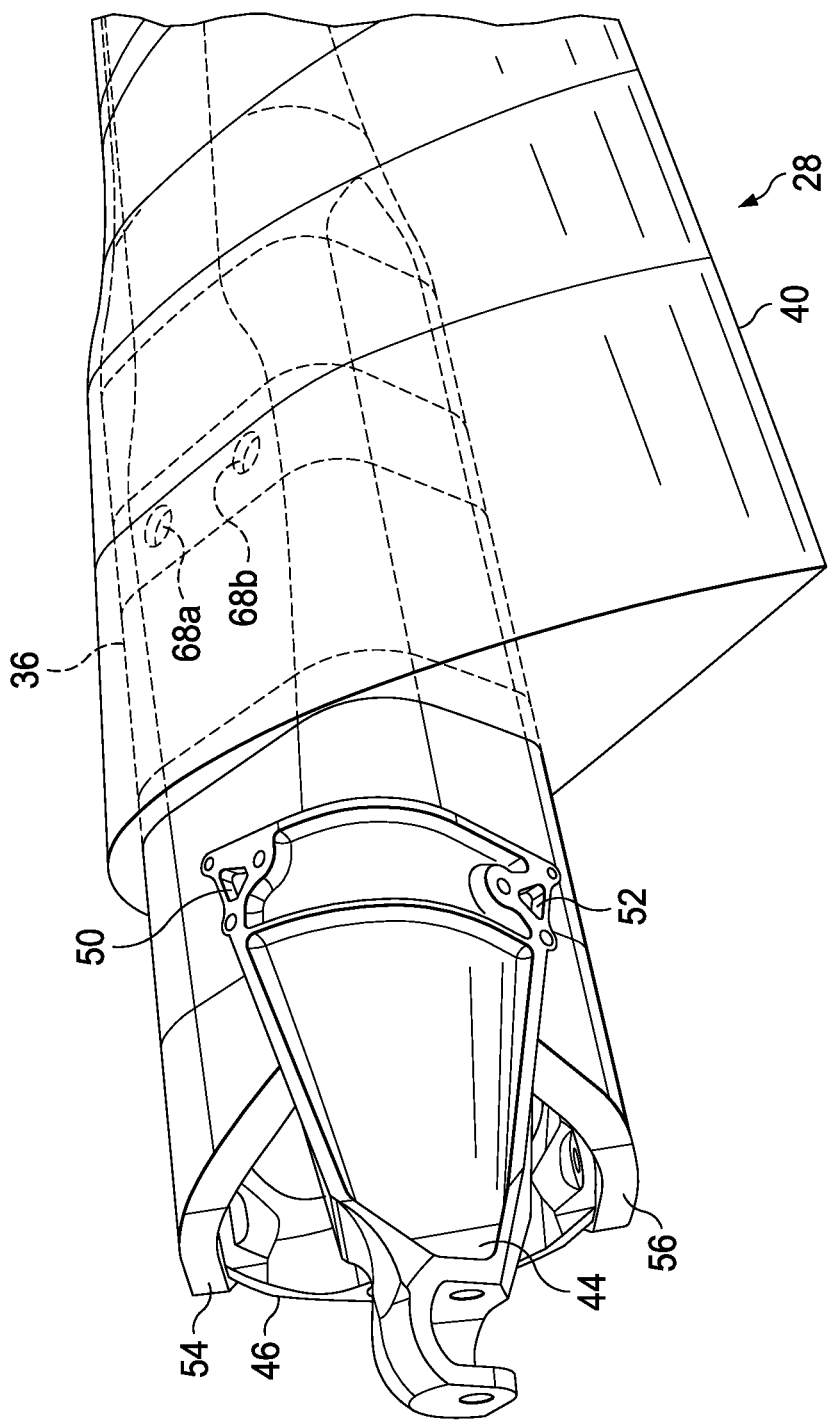
FIG. 5 is another partial view of the proprotor blade assembly of FIG. 4 configured for nonfoldable operations.

FIG. 5 shows a partial view of the proprotor blade assembly 28 configured for nonfoldable operations. The pitch horn 44 and inboard beam 46 are shown. A portion of the nonfoldable spar assembly 36 that is proximate to the rotor hub assembly 26 comprises flat surfaces to aide in coupling the nonfoldable spar assembly 36 to the pitch horn 44 and inboard beam 46. Specifically, the pitch horn 44 is coupled to a first pitch horn flat 50 and to a second pitch horn flat 52. The inboard beam 46 is coupled to a first inboard beam flat 54 and a second inboard beam flat 56. Furthermore, the nonfoldable spar assembly 36 comprises two integral cuff bolt holes 68a, 68b. The integral cuff bolt holes 68a, 68b are located along a top wall and bottom wall of the nonfoldable spar assembly 36 and are used to couple the nonfoldable spar assembly 36 to the rotor hub assembly 28 via an attachment arm at the end of the rotor yoke 48.

Figure 6:
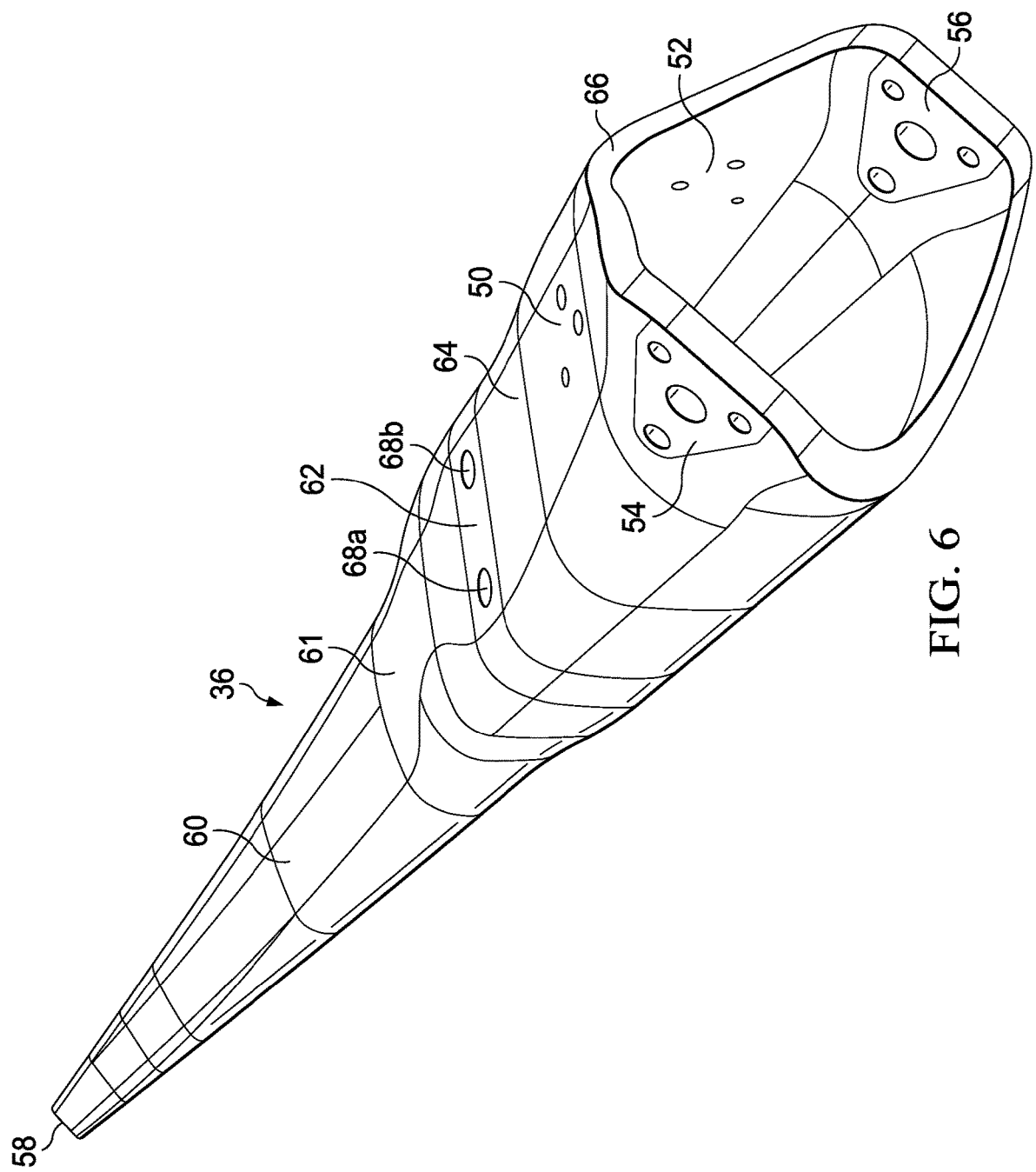
FIG. 6 is an oblique view of a nonfoldable spar assembly of the proprotor blade assembly of FIG. 4, in accordance with embodiments of the present disclosure.

FIG. 6 shows an oblique view of a nonfoldable spar assembly 36. The nonfoldable spar assembly 36 comprises a spar tip 58, spar root 66, a main section 60, a transition section 61, a middle section 62, and a root section 64. The spar tip 58 is located at the furthest outboard end of the nonfoldable spar assembly 36, relative to the center of rotor hub assembly 26. Conversely, the spar root 66 is located at the furthest inboard end of the nonfoldable spar assembly 36, relative to the center of the rotor hub assembly 26. The main section 60 extends across about 60% to about 85% of the nonfoldable spar assembly's 36 lengthwise span. The main section 60 has a generally oval-shaped cross-section with curved top, bottom, left, and right walls throughout its lengthwise span. Further inboard, the main section 60 is joined to the middle section 62 via the transition section 61. The middle section 62 extends across about 10% to about 35% of the nonfoldable spar assembly's 36 lengthwise span. The middle section 62 comprises generally rectangular-shaped cross-sections with substantially flat top, bottom, left, and right walls throughout its lengthwise span. Portions of the middle section 62 comprise curved corners that connect its substantially flat walls. The integral cuff bolt holes 68a, 68b are formed in the top flat wall and bottom flat wall of the middle section 62. Further inboard still, the middle section 62 connects to the root section 64. The root section 64 proximately extends across 5%-25% of the nonfoldable spar assembly's 36 lengthwise span and extends to the spar root 66. The root section 64 comprises generally curved cross-sections with curved top, bottom, left, and right walls throughout its lengthwise span. The root section 64 can have flat surfaces (the first pitch horn flat 50, and the second pitch horn flat 52, the first inboard beam flat 54, and the second inboard beam flat 56) with coupling apertures to accommodate the pitch horn 44 and the inboard beam 46.

Figure 7:
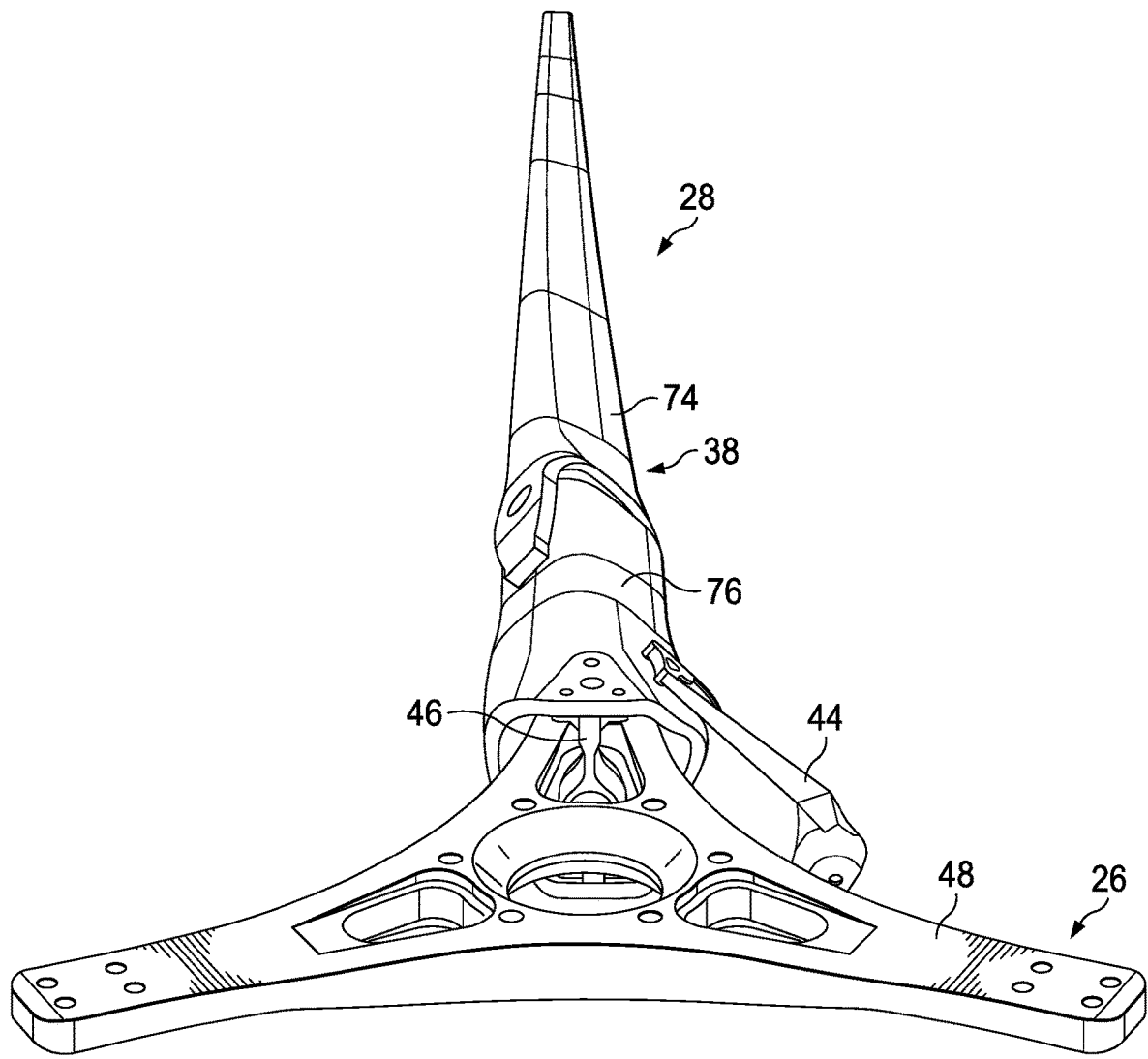
FIG. 7 is a partial view of a rotor hub assembly and a proprotor blade assembly configured for foldable operations in accordance with embodiments of the present disclosure.

Referring to FIG. 7, a partial view of the rotor hub assembly 26 and the proprotor blade assembly 28 configured for foldable operations are illustrated. The swashplate, the rotor hub spring, the mast spinner, the pitch links, and other common parts are not shown. Also, only one of three proprotor blade assemblies 28 is shown. The rotor hub assembly 26 can include a rotor yoke 48, a pitch horn 44, and an inboard beam 46. The pitch horn 44 and inboard beam 46 mechanically couple the rotor hub assembly 26 to the proprotor blade assembly 28. The proprotor blade assembly 28 as shown in FIG. 7 is configured for foldable operations and comprises a foldable spar assembly 38. The foldable spar assembly 38 comprises a main spar piece 74 that forms an outboard portion of the foldable spar assembly 38 and a grip spar piece 76 that forms an inboard end of the foldable spar assembly 38. The grip spar piece 76 is disposed between the rotor hub assembly 26 and the main spar piece 74. The foldable common blade assembly is not shown in FIG. 7 or FIG. 8. The foldable common blade assembly is substantially similar to the common blade assembly 40 but is configured to fold with the foldable spar assembly 38. Generally, the foldable common blade assembly can include an upper and lower skin, a sheath, an abrasion strip, tip cap, erosion shield, a heater blanket, and other commonly used blade components. A majority of the foldable spar assembly's 38 lengthwise span is received within the foldable common blade assembly. A portion of the foldable spar assembly 38 that is proximate to the rotor hub assembly 26 extends outside the foldable common blade assembly and couples the proprotor blade assembly 28 to the pitch horn 44 and inboard beam 46.

Figure 8:
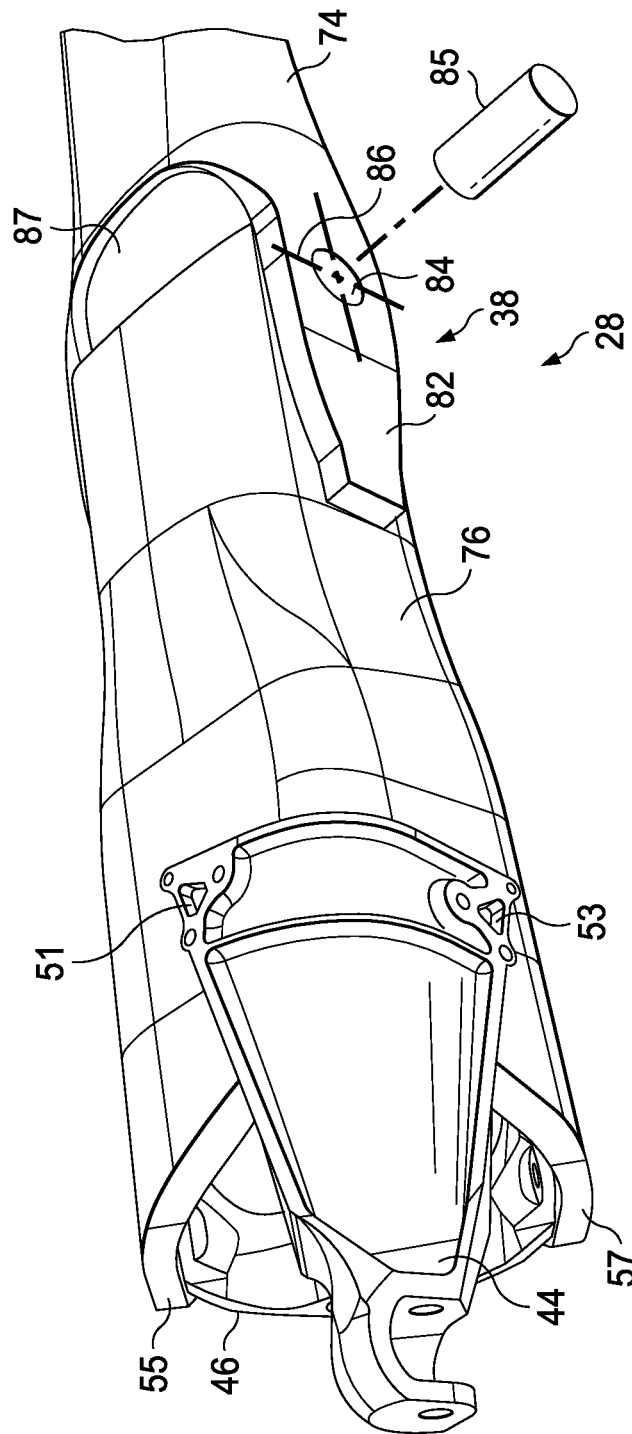
FIG. 8 is another partial view of the proprotor blade assembly of FIG. 7 configured for foldable operations.

FIG. 8 shows a partial view of the proprotor blade assembly 28 as configured for foldable operations. The pitch horn 44 and inboard beam 46 are shown for reference. A portion of the foldable spar assembly's 38 grip spar piece 76 that is proximate to the rotor hub assembly 26 comprises flat surfaces to couple the foldable spar assembly 38 to the pitch horn 44 and inboard beam 46. Specifically, the pitch horn 44 couples to the first pitch horn flat 51 and the second pitch horn flat 53; and the inboard beam 46 couples to the first inboard beam flat 55 and second inboard beam flat 57. Importantly, the foldable spar assembly 38 and nonfoldable spar assembly 36 are each configured to couple with the same pitch horn 44, inboard beam 46, and rotor hub assembly 26. An inboard section 80 of the main spar piece 74 is substantially similar to the middle section 62 of the nonfoldable spar assembly 36, but with material selectively removed to form blade tangs 82. The blade tangs 82 are generally rectangular shaped and comprise pin holes 84. The pin holes 84 are coaxially aligned with one another and are used in conjunction with a pin 85 to couple the main spar piece 74 to the grip spar piece 76. In alternative embodiments, other means can be used to couple the main spar piece 74 to the grip spar piece 76. For example, two separate pins may be inserted into each of the pin holes 84. The pin 85 provides a single degree of freedom to selectively fold the main spar piece 74 relative to the main spar piece 76 about the pin axis 86. The blade tangs 82 extend outward from the main spar piece 74 and run along the left and right walls of the grip spar piece 76. The blade tangs 82 are positioned to fold the main spar piece 74 in a beamwise direction relative to the rotor hub assembly 26. To enable greater clearance, a gap 87 is left between the main spar piece 74 and the grip spar piece 76. In an alternative embodiment, by configuring the blade tangs 82 to couple to the top and bottom walls of the grip spar piece 76, the main spar piece 74 can be configured to fold in a direction parallel to the rotor assembly 20 such that the spar tip 70 would generally point in a downward direction.

Figure 9:
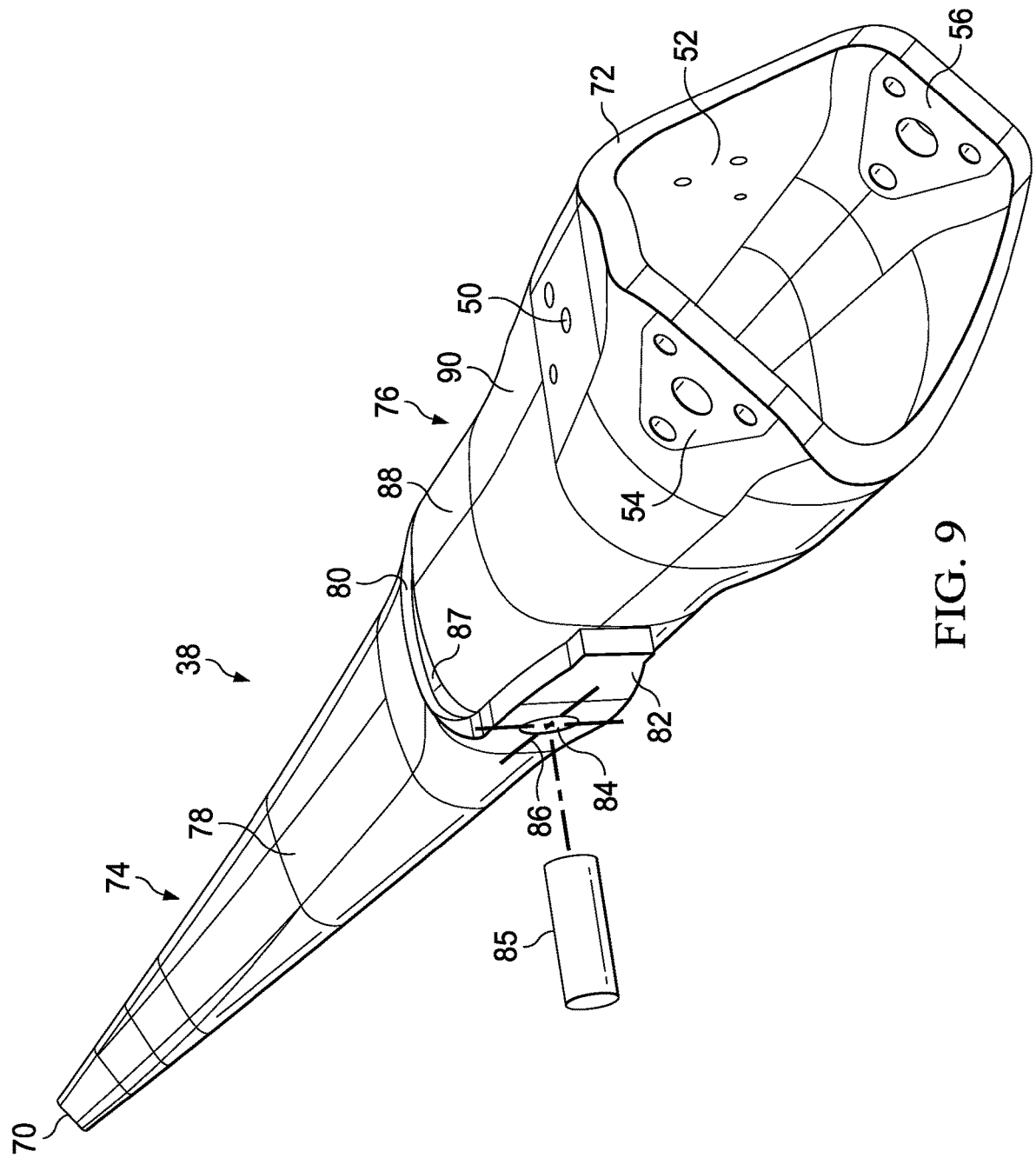
FIG. 9 is an oblique view of a foldable spar assembly of the proprotor blade assembly of FIG. 7, in accordance with embodiments of the present disclosure.

FIG. 9 shows an oblique view of a foldable spar assembly 38. The foldable spar assembly 38 comprises a spar tip 70 and a spar root 72. The spar tip 70 is located at the furthest outboard end of the foldable spar assembly 38, relative to the center of rotor hub assembly 26. Conversely, the spar root 72 is located at the furthest inboard end of the foldable spar assembly 38, relative to the center of the rotor hub assembly 26.

The main spar piece 74 comprises an outboard section 78 and an inboard section 80. The outboard section 78 extends across about 60% to about 85% of the foldable spar assembly's 38 lengthwise span. The outboard section 78 comprise generally oval-shaped cross-sections made up of curved top, bottom, left, and right walls. Further inboard, the outboard section 78 is joined to the inboard section 80. The inboard section 80 extends across about 10% to about 35% of the foldable spar assembly's 38 lengthwise span. The inboard section 80 comprises substantially flat left and right walls and can have generally rectangular-shaped cross-sections with additional substantially flat top and bottom walls; however, further inboard, the top and bottom walls of the inboard section 80 terminate and portions of the flat left and right walls form the blade tangs 82.

The grip spar piece 76 comprises an outboard section 88 and an inboard section 90. The outboard section 88 runs substantially congruous to the main spar piece's 74 inboard section 80 and extends across about 10% to about 35% of the of the foldable spar assembly's 38 lengthwise span. It should be noted that the pictured outboard section 88 generally does not extend as far outboard as the main spar piece's 74 inboard section 80, due to the gap 87 between the main spar piece 74 and the grip spar piece 76. Additionally, the outboard section 88 generally extends further inboard than the main spar piece's 74 inboard section 80. The outboard section 88 comprises generally rectangular-shaped cross-ssections with flat top, bottom, left, and right walls; however, to accommodate the blade tangs 82, the rectangular-shaped cross-section of the outboard section 88 is narrower than the main spar piece's 74 inboard section 80. Further inboard of the foldable spar assembly 38, the outboard section 88 transitions into the inboard section 90. The inboard section 90 extends across about 5% to about 25% of the foldable spar assembly's 38 lengthwise span and extends to the spar root 72. The inboard section 90 comprises generally curved cross-sections with curved top, bottom, left, and right walls throughout its lengthwise span. The inboard section 90 can have flat surfaces (the first pitch horn flat 50, and the second pitch horn flat 52, the first inboard beam flat 54, the second inboard beam flat 56) with coupling apertures to accommodate the pitch horn 44 and the inboard beam 46.

Figure 10:
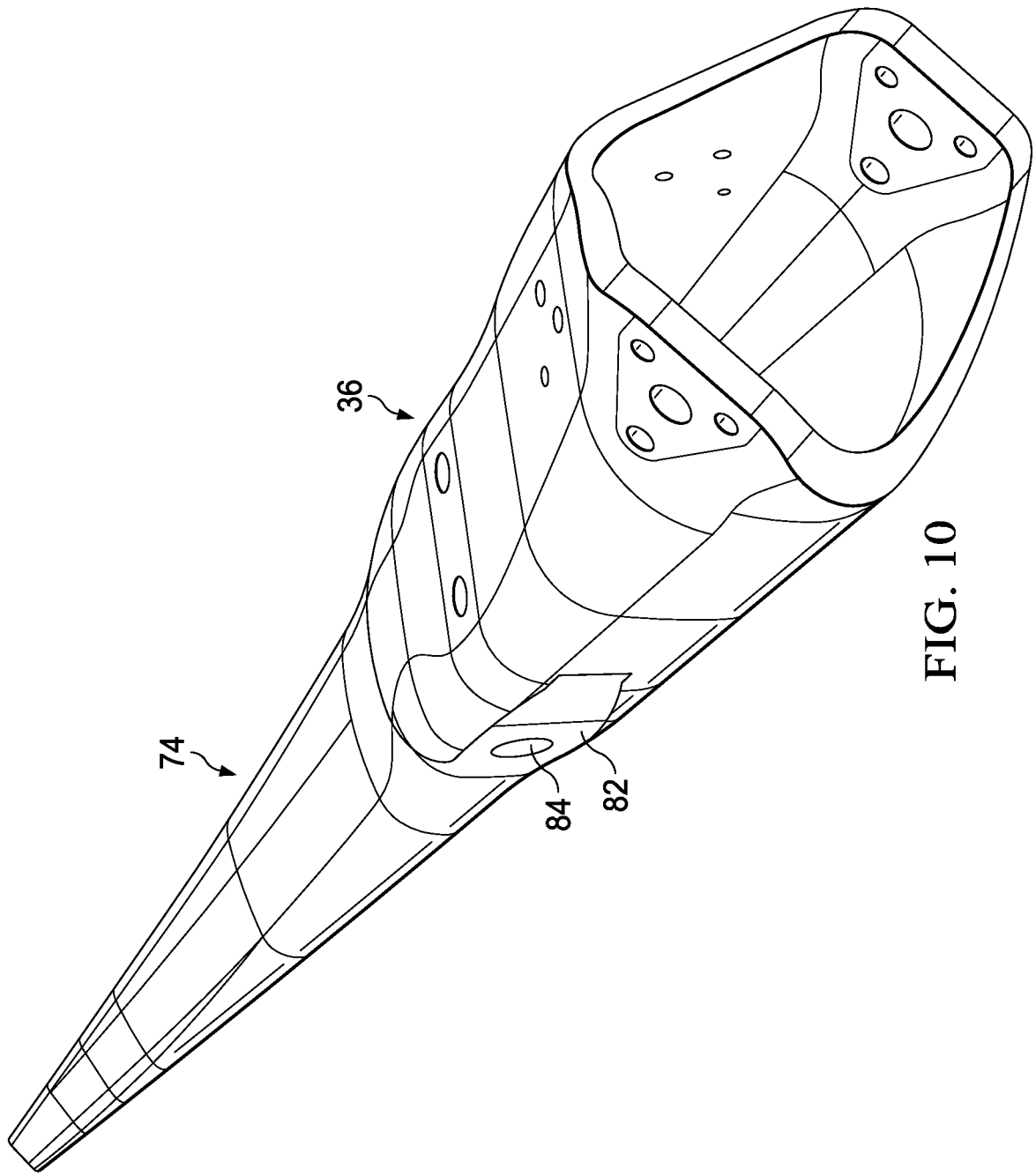
FIG. 10 is an oblique view of a nonfoldable spar assembly for use in a proprotor blade assembly, with the main spar piece of the foldable spar assembly superimposed over its main section.
Figure 11:
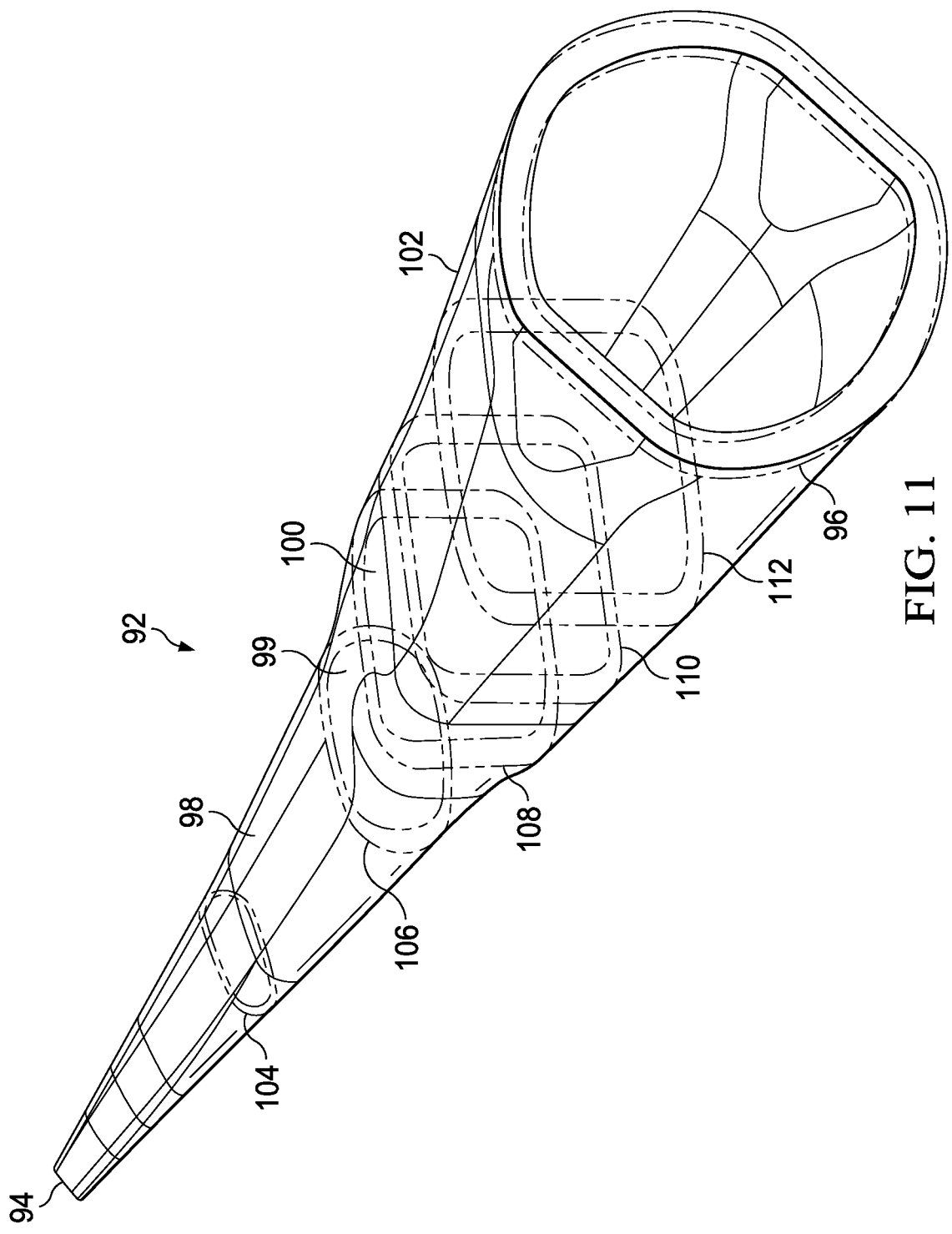
FIG. 11 is an oblique view of a common spar assembly including cross-section cutting planes at various radial stations for use in a proprotor blade assembly in accordance with embodiments of the present disclosure.

Referring to FIG. 10 an oblique view of the isolated nonfoldable spar assembly 36 is shown, with the foldable spar assembly's 38 main spar piece 74 superimposed over the nonfoldable spar assembly's 36 main section 60 and middle section 62. The figure illustrates the high degree of similarity between the nonfoldable spar assembly's 36 and main spar piece's 74 cross-section shape. The main spar piece's 74 outboard section 78 aligns with the nonfoldable assembly's 36 main section 60. Additionally, the main spar piece's 74 inboard section 80 is flushed with the nonfoldable spar assembly's 36 middle section 62. Specifically, the blade tangs 82 are aligned with the left and right walls of the middle section 62. Due to the similarities between the nonfoldable spar assembly 36 and the main spar piece 74, one common spar assembly 92 can be used to manufacture both the nonfoldable spar assembly 36 and the main spar piece 74.

Referring to FIG. 11 and FIGS. 12A-12G, various cross-sectional representations of the common spar assembly 92 at a plurality of radial stations along the common spar assembly 92 are depicted. The common spar assembly 92 comprises a common spar tip 94, a common spar root 96, a main section 98, a transition section 99, a middle section 100, and a root section 102. Radial stations 104, 106, 108, 110, and 112 are situated throughout the main section 98, the middle section 100, and the root section 102.

Figure 12A:
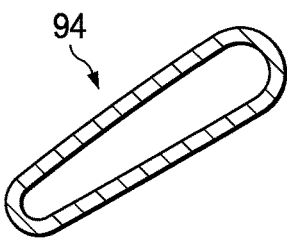
FIGS. 12A-12G are cross-sectional views taken at the various radial stations of FIG. 11 depicting the layup of broad goods used to form a spar in accordance with embodiments of the present disclosure.
Figure 12B:
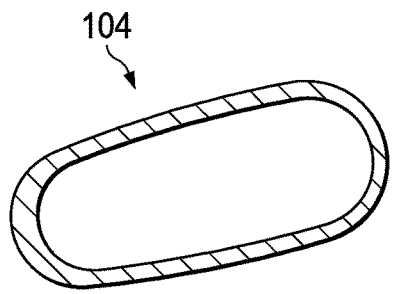
Figure 12C:
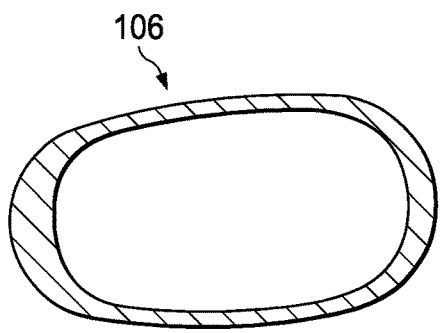

The common spar assembly's 92 the main section 98 extends across about 60% to about 85% of the common spar assembly's 92 lengthwise span. It is advantageous to maximize the similarities between the nonfoldable spar assembly 36 and foldable spar assembly 38 by maximizing the lengthwise span of the main section 98. The main section 98 has generally oval-shaped cross-sections made up of curved top, bottom, left, and right walls. For example, at the common spar tip 94 and the radial stations 104 and 106 the cross-sections are made up of curved walls, as best seen in FIGS. 12A-12C.

Figure 12D:
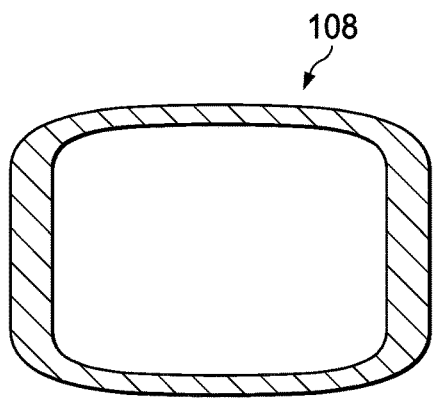

Further inboard, the main section 98 is joined to the middle section 100 via the transition section 99. For example, at radial station 108 the cross-section shape is generally a transitionary shape between oval-shaped and rectangular-shaped that incorporates both curved top and bottom walls and flat left and right walls, as best seen in FIG. 12D.

Figure 12E:
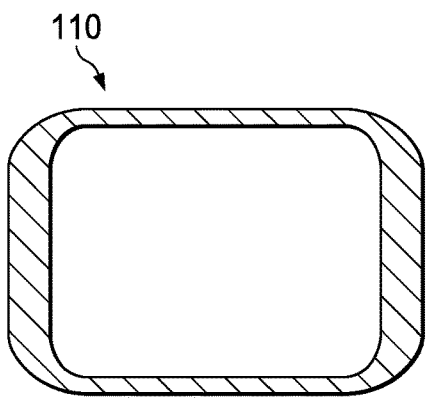

Further inboard of radial station 108 the common spar assembly 92 fully transitions into the middle section 100. The middle section 100 extends across about 10% to about 35% of the common spar assembly's 92 lengthwise span. The middle section 100 comprises generally rectangular-shaped cross-sections with flat top, bottom, left, and right walls. For example, at the radial station 110 the cross-section includes flat top, bottom, left, and right walls connected by four curved corners, as best seen in FIG. 12E.

Figure 12F:
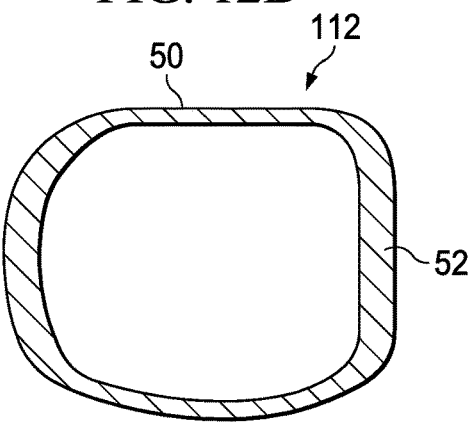
Figure 12G:
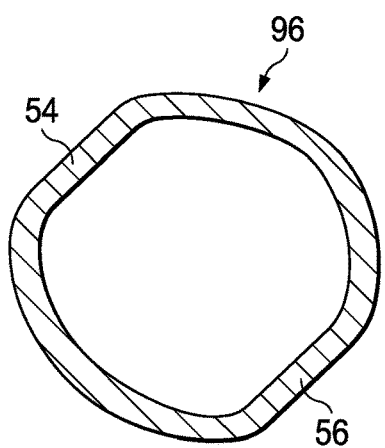

Further inboard of radial station 110 the common spar assembly 92 transitions into the root section 102. The root section 102 has generally curved top, bottom, left, and right walls throughout its span, along with flat surfaces (the first pitch horn flat 50, the second pitch horn flat 52, the first inboard beam flat 54, and the second inboard beam flat 56) to accommodate the pitch horn 44 and the inboard beam 46. The common spar assembly's 92 root section 102 comprises extends across about 5% to about 25% of the common spar assembly's 92 lengthwise span and extends to the spar root 72. For example, at radial station 112 the cross-section is made up of curved walls with the first pitch horn flat 50 and the second pitch horn flat 52 to accommodate the pitch horn 44, as best seen in FIG. 12F. Furthermore, at the common spar root 96, the cross-section is made up of curved surfaces with the first inboard beam flat 54 and the second inboard beam flat 56 to accommodate the inboard beam 46, as best seen in FIG. 12G.

In a post-processing procedure, the common spar assembly 92 can be manufactured into the nonfoldable spar assembly 36. First, the root section 102 is modified by drilling coupling apertures for the pitch horn 44 and the inboard beam 46 into the first pitch horn flat 50, the second pitch horn flat 52, the first inboard beam 54, and the second inboard beam 56. Cuff bolt holes 68a, 68b are then drilled into the top wall and bottom wall of the rectangular-shaped middle section 100. Afterward, the completed nonfoldable spar assembly 36 can be coupled to the common blade assembly 40 to form the proprotor blade assembly 28.

An additional manufacturing step can further optimize the nonfoldable spar assembly 36. A processing or post-processing technique can be used to remove unnecessary structure and weight from the nonfoldable spar assembly 36. Because the nonfoldable spar assembly 36 does not require additional structure to form the blade tangs 82, the rectangular-shaped cross-section of the common spar assembly 92 can be thinned. Specifically, mandrel tools can thin an inner wall of the middle section 100 during the processing of the common spar assembly 92. This process reduces the weight of the nonfoldable spar assembly 36 and enhances the performance of the completed proprotor blade assembly 28.

In another post-processing procedure, the common spar assembly 92 can be manufactured into the foldable spar assembly's 38 main spar piece 74. First, the common spar assembly's 92 root section 102 is removed. The top and bottom walls of the middle section 100 are then shortened and faired into the main section 98. Afterward, the right and left walls of the middle section 100 are shaped into the blade-tangs 82. Finally, pin holes 84 are drilled into each blade tangs 82. A completed foldable spar assembly 38 is then created by coupling the main spar piece 74 to a separately constructed grip spar piece 76, via the pin 85. The proprotor blade assembly 28 can then be formed from the completed foldable spar assembly 38.

Due to the high degree of similarity between the nonfoldable spar assembly 36 and the main spar piece 74, the foldable spar assembly's 38 main spar piece 74 can be manufactured from a completed or damaged nonfoldable spar assembly 36 (assuming that the damage is limited to the root section 64 and/or the top and bottom walls of the middle section 62). First, the nonfoldable spar assembly's 36 root section 64 is removed. The top and bottom walls of the middle section 62 are then removed and faired into the main section 60. The right and left walls of the middle section 62 are then shaped into the blade tangs 82. Finally, apertures for pin holes 84 are drilled into each of the blade tangs 82. A completed foldable spar assembly 38 can then be created by coupling the main spar piece 74 to a separately constructed grip spar piece 76, via the pin 85. Afterward, the completed foldable spar assembly 38 can be coupled to the foldable common blade assembly to form the proprotor blade assembly 28.

Figure 13:
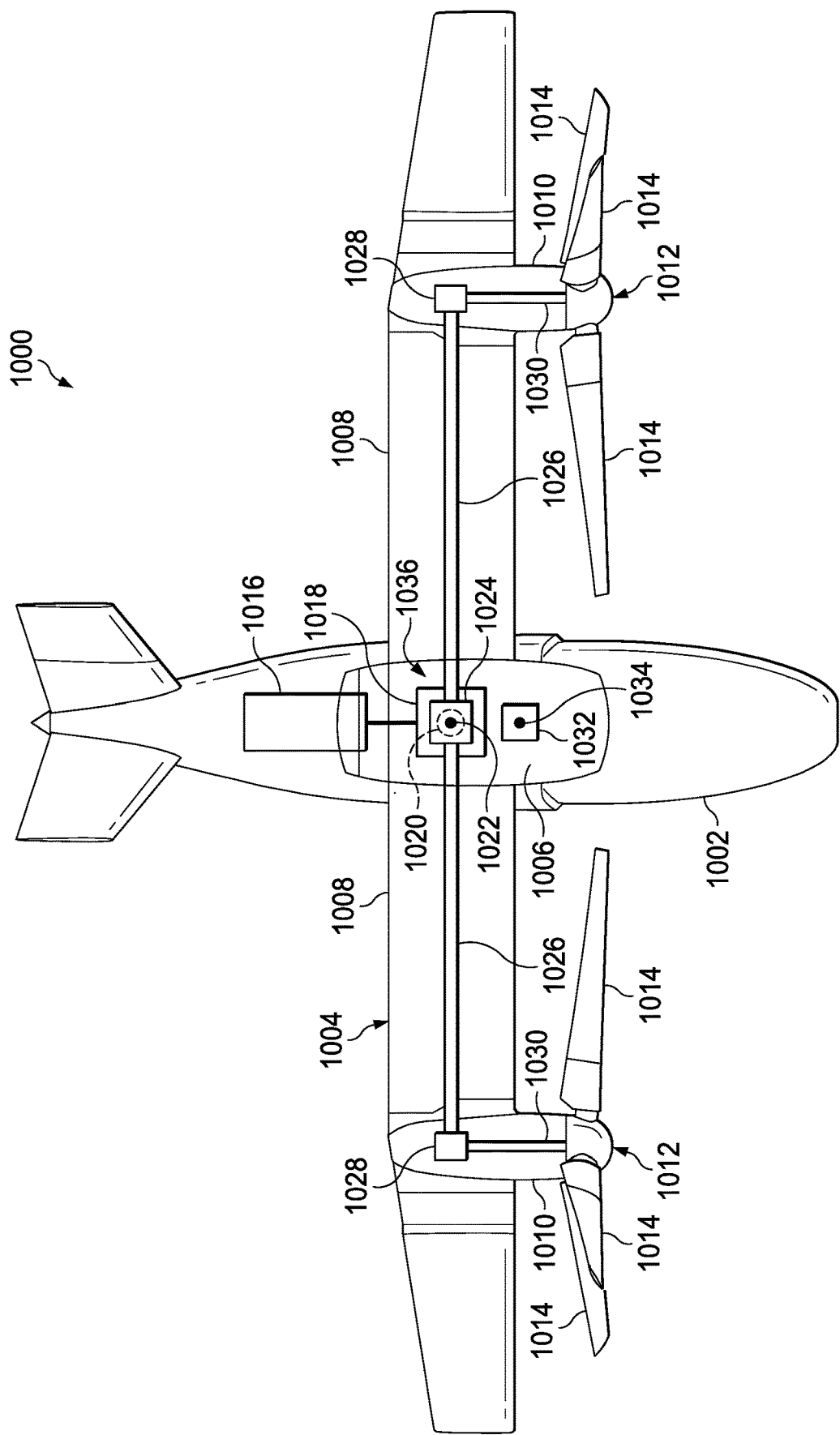
FIG. 13 is a top view of another aircraft according to this disclosure.

Referring now to FIG. 13, a top view of another aircraft 1000 is shown according to this disclosure. Aircraft 1000 is shown and described as a tiltrotor aircraft. However, aircraft 1000 may be any type of vehicle. Aircraft 1000 includes a fuselage 1002 and a stowable wing assembly 1004 including a rotatable wing body 1006 and a plurality of wings 1008 extending therefrom. Each wing 1008 has a pylon 1010 coupled thereto. Pylons 1010 each include a rotor assembly 1012 with a plurality of proprotor blade assemblies 1014. The proprotor blade assemblies are substantially similar to the above-described proprotor blade assemblies 28. Each pylon 1010 is rotatable between a horizontal orientation and a vertical orientation with respect to fuselage 1002 and associated wing 1008 to adjust the thrust angle and transition aircraft 1000 between an airplane mode and a helicopter mode. Accordingly, the airplane mode is associated with a more horizontally-oriented thrust angle and propelling aircraft 1000 forward in flight, while the helicopter mode is associated with a more vertically-oriented thrust angle and propelling aircraft 1000 to and from a landing area.

Aircraft 1000 also includes a drive component carried in fuselage 1002. In the embodiment shown, the drive component includes an internal combustion engine 1016 coupled to an engine reduction gearbox 1018 which features a retractable driveshaft 1020. However, in other embodiments, the drive component may comprise a direct-drive electric motor, a direct-drive engine, a motor and gearbox combination, or an engine and a redirection gearbox, each having retractable driveshaft 1020. In the embodiment shown, operation of internal combustion engine 1016 causes retractable driveshaft 1020 to rotate about a rotation axis 1022. Retractable driveshaft 1020 is extended and retracted axially along rotation axis 1022 to engage and disengage from an auxiliary or mid-wing gearbox 1024 disposed within rotatable wing body 1006 of wing assembly 1004. Mid-wing gearbox 1024 is operatively coupled to an interconnect driveshaft 1026 extending therefrom through each wing 1008 to a pylon gearbox 1028 disposed in each pylon 1010. Each pylon gearbox 1028 is coupled to associated rotor assembly 1012 through a rotor mast 1030. Thus, when retractable driveshaft 1020 is engaged with mid-wing gearbox 1024, rotation of retractable driveshaft 1020 imparted by internal combustion engine 1016 is transmitted through mid-wing gearbox 1024 to interconnect driveshafts 1026 and rotor masts 1030 to impart rotation to counter-rotating rotor assemblies 1012. Conversely, when retractable driveshaft 1020 is disengaged from mid-wing gearbox 1024, rotation of retractable driveshaft 1020 will not impart rotation to rotor assemblies 1012. As such, retractable driveshaft 1020 allows internal combustion engine 1016 to operate to run pre-flight checks, provide electrical power, and/or provide functions of an auxiliary power unit without engaging rotor assemblies 1012.

Aircraft 1000 may also include a wing assembly rotation system 1032 configured to rotate wing assembly 1004 with respect to fuselage 1002 about a stow axis 1034. Most notably, stow axis 1034 is offset from rotation axis 1022 of retractable driveshaft 1020. More specifically, stow axis 1034 is displaced longitudinally along a length of fuselage 1002 with respect to rotation axis 1022 of retractable driveshaft 1020. In some embodiments, the offset between stow axis 1034 and rotation axis 1022 may be about twelve inches. The location of rotation axis 1022 is generally determined by the optimal placement of interconnect driveshafts 1026 and/or mid-wing gearbox 1024 within wing assembly 1004. Stow axis 1034 is generally selected to center wing assembly 1004 over fuselage 1002, thereby reducing the overall footprint of aircraft 1000 when wing assembly 1004 is rotated. Further, offsetting stow axis 1034 further forward on wing assembly 1004 may provide structural benefits, such as allowing rotation of wing assembly 1004 in a thicker, more structurally rigid portion of wing assembly 1004. Additionally, retractable driveshaft 1020 must be capable of disengaging from mid-wing gearbox 1024 and fully withdrawing from wing assembly 1004 because stow axis 1034 and rotation axis 1022 are not co-axial. Because engine reduction gearbox 1018, retractable driveshaft 1020, mid-wing gearbox 1024, and wing assembly rotation system 1032 function together to facilitate the transition to a stowed configuration, they may be referred to collectively as a stow system 1036.

Figure 14:
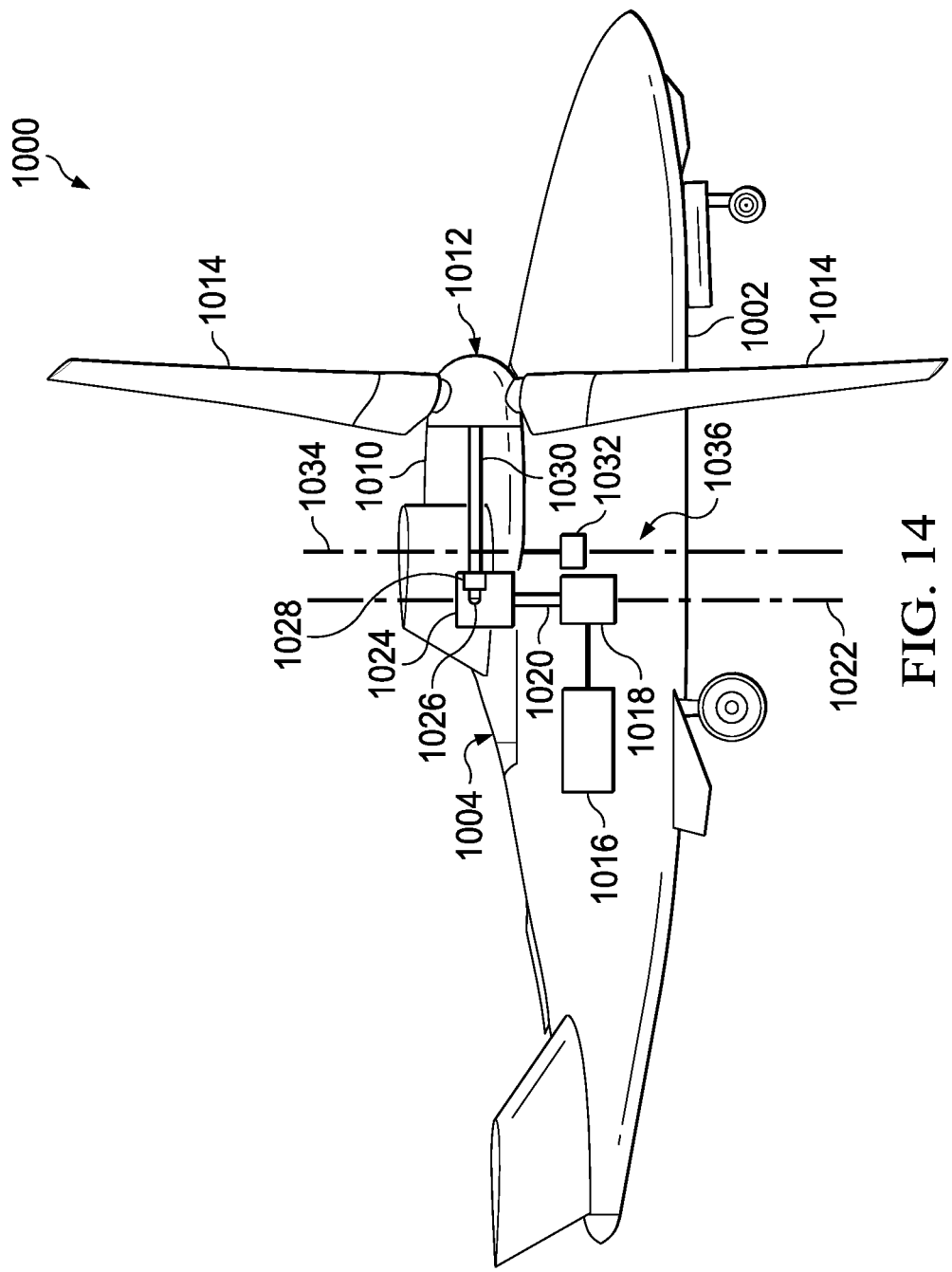
FIG. 14 is a side view of the aircraft of FIG. 13.

Referring now to FIG. 14, aircraft 1000 is shown with retractable driveshaft 1020 engaged with mid-wing gearbox 1024 and wing assembly 1004 in a flight position. As shown, retractable driveshaft 1020 is extended vertically to engage mid-wing gearbox 1024 when wing assembly 1004 is configured in the flight position. Thus, when retractable driveshaft 1020 is engaged with mid-wing gearbox 1024, rotational motion of retractable driveshaft 1020 imparted by internal combustion engine 1016 is transferred through mid-wing gearbox 1024 to interconnect driveshafts 1026 and rotor masts 1030 to impart rotation to counter-rotating rotor assemblies 1012 to propel aircraft 1000.

Figure 15:
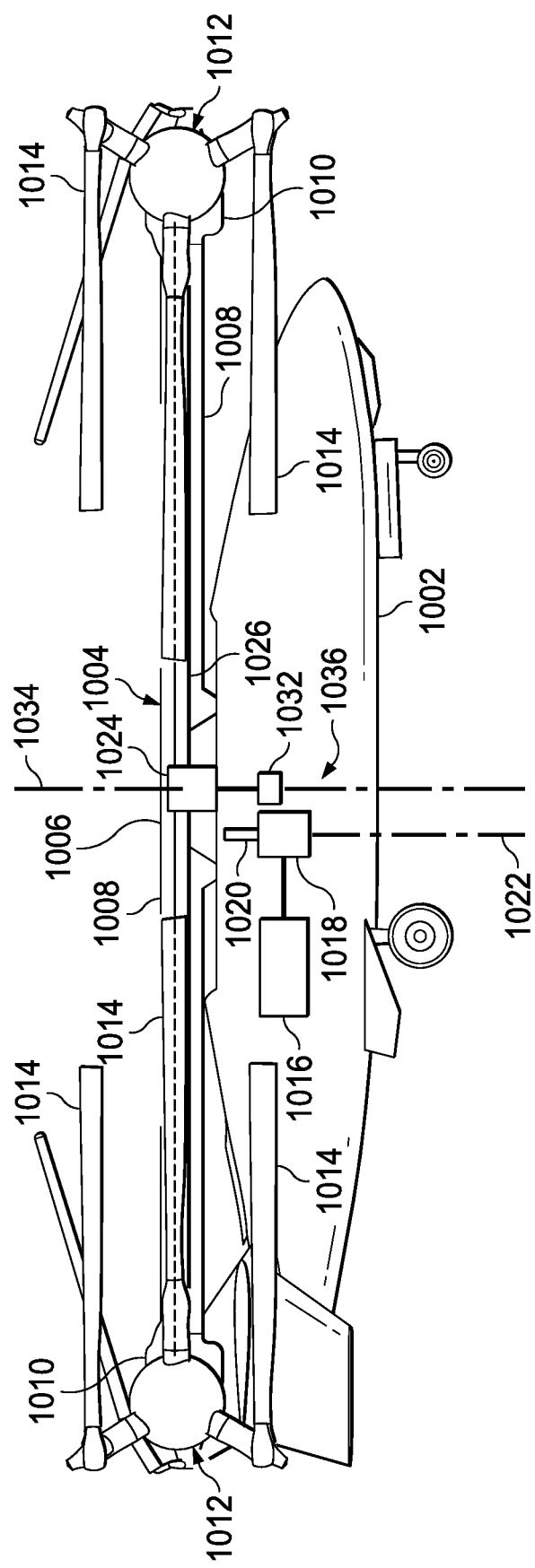
FIG. 15 is another side view of the aircraft of FIG. 13.

Referring now to FIG. 15, aircraft 1000 is shown with retractable driveshaft 1020 disengaged from mid-wing gearbox 1024 and wing assembly 1004 in a stowed position. As shown, retractable driveshaft 1020 is retracted vertically to disengage from mid-wing gearbox 1024. After retractable driveshaft 1020 is disengaged from mid-wing gearbox 1024, wing assembly 1004 may be rotated relative to fuselage 1002 about stow axis 1034 in a clockwise direction as viewed from the top of aircraft 1000 until wing assembly 1004 reaches the stowed position. In the stowed position, retractable driveshaft 1020 is misaligned from mid-wing gearbox 1024. In some embodiments, the stowed configuration of wing assembly 1004 may be reached after wing assembly 1004 is rotated about ninety degrees. Furthermore, wing assembly 1004 may be rotated relative to fuselage 1002 about stow axis 1034 in a counter-clockwise direction.

While this disclosure has been described with reference to illustrative embodiments, this description is not intended to be construed in a limiting sense. Various modifications and combinations of the illustrative embodiments as well as other embodiments will be apparent to persons skilled in the art upon reference to the description. It is, therefore, intended that the appended claims encompass any such modifications or embodiments.

What is claimed is:

1. A method of constructing a foldable spar assembly, comprising:
   providing a common spar, comprising:
      a tip comprising a most outboard portion of the spar;
      a root comprising a most inboard portion of the spar;
      a main section disposed inboard relative to the tip that is comprised exclusively of curved surfaces; and
      a middle section disposed inboard relative to the main section, the middle section comprising a first set of opposing flat outer surfaces and a second set of opposing flat outer surface situated laterally between and substantially perpendicular to the first set of opposing flat outer surfaces;
         wherein the first set of opposing flat outer surfaces are configured to accommodate bolt holes for a nonfoldable spar assembly;
         wherein the second set of opposing flat outer surface are configured to accommodate tang holes for a foldable spar assembly; and
   joining the main section and the middle section using a transition section, the transition section comprising an outboard interface cross-sectional shape and an inboard cross-sectional shape that is different than the outboard interface cross-sectional shape;
   drilling holes through the second set of opposing flat outer surfaces, wherein the holes are coaxially aligned; and
   removing the root and a majority of the first set of opposing flat outer surfaces.

2. The method of claim 1, further comprising:
   forming the second set of opposing flat outer surfaces into blade tangs.

3. The method of claim 2, wherein the blade tangs extend inboard and outboard of the holes.

\* \* \* \* \*